(12) United States Patent
Hoernicke et al.

(10) Patent No.: US 12,140,936 B2
(45) Date of Patent: Nov. 12, 2024

(54) CONFIGURING MODULAR INDUSTRIAL PLANTS

(71) Applicant: ABB Schweiz AG, Baden (CH)

(72) Inventors: Mario Hoernicke, Landau (DE); Katharina Stark, Weinheim (DE); Roland Braun, Niederkassel Luesldorf (DE); Michael Vach, Wilhelmsfeld (DE); Sten Gruener, Laudenbach (DE); Nicolai Schoch, Heidelberg (DE); Marcel Dix, Mannheim (DE)

(73) Assignee: ABB Schweiz AG, Baden (CH)

( * ) Notice: Subject to any disclaimer, the term of this patent is extended or adjusted under 35 U.S.C. 154(b) by 346 days.

(21) Appl. No.: 17/520,738

(22) Filed: Nov. 8, 2021

(65) Prior Publication Data

US 2022/0147025 A1  May 12, 2022

(30) Foreign Application Priority Data

Nov. 10, 2020  (EP) .................................... 20206705

(51) Int. Cl.
G05B 19/418      (2006.01)
(52) U.S. Cl.
CPC ............ *G05B 19/4188* (2013.01); *G05B 2219/50158* (2013.01)
(58) Field of Classification Search
CPC ...... G05B 19/4188; G05B 2219/50158; G05B 2219/32137; G05B 19/056; G05B 19/41885; G05B 2219/32339; Y02P 90/02
See application file for complete search history.

(56) References Cited

U.S. PATENT DOCUMENTS

2005/0096872 A1* 5/2005 Blevins ............ G05B 19/41885
                                                   702/183
2006/0253205 A1* 11/2006 Gardiner ................. G06F 40/40
                                                   700/20
(Continued)

FOREIGN PATENT DOCUMENTS

CN        210181455 U      3/2020
CN        111722598 A      9/2020
(Continued)

OTHER PUBLICATIONS

Bernshausen et al., "Namur Module Type Package—Definition—Describing the Automation of Modular Plants," *atp edition*, 58 (1-2): 72-81 (Jan. 1, 2016).
(Continued)

*Primary Examiner* — Christopher E. Everett
(74) *Attorney, Agent, or Firm* — Leydig, Voit & Mayer, Ltd.

(57) ABSTRACT

A method for configuring a modular industrial plant using an engineering tool includes using a plant engineering facility of the tool to create a representation of the modular industrial plant identifying modules to be orchestrated in the modular industrial plant. The modules include at least one function module that includes control software for the modular industrial plant. The method further includes using a module engineering facility of the tool to configure the function module for use in the modular industrial plant by editing a placeholder configuration file created by the tool for defining the configuration of the function module. Editing the configuration file causes a representation of the function module in the plant engineering facility to be automatically updated to reflect adaptations made to the function module using the module engineering facility. The (Continued)

method includes instructing the tool to assign the function modules so configured to the modular industrial plant.

13 Claims, 10 Drawing Sheets

(56) References Cited

U.S. PATENT DOCUMENTS

| | | | |
|---|---|---|---|
| 2007/0156264 A1* | 7/2007 | Schleiss | G05B 19/0428 700/83 |
| 2009/0287321 A1* | 11/2009 | Lucas | G06F 21/6218 700/83 |
| 2009/0327967 A1 | 12/2009 | Matsuda et al. | |
| 2011/0131017 A1 | 6/2011 | Cheng et al. | |
| 2013/0006390 A1* | 1/2013 | Kreft | G05B 19/056 700/10 |
| 2016/0132048 A1* | 5/2016 | Kambe | G05B 19/418 700/87 |
| 2017/0336782 A1 | 11/2017 | Maurmaier et al. | |
| 2018/0113430 A1 | 4/2018 | Naidoo et al. | |

FOREIGN PATENT DOCUMENTS

| | | |
|---|---|---|
| DE | 19704662 A1 | 8/1998 |
| EP | 2541352 A2 | 1/2013 |
| EP | 3021185 A2 | 5/2016 |

OTHER PUBLICATIONS

Bloch et al., "State-based control of process services within modular process plants," *51st CIRP Conference on Manufacturing Systems*, Procedia CIRP 72: 1088-1093 (2018).

Hoernicke et al., "Modular Process Plants: Part 2—Plant Orchestration and Pilot Application," *ABB Review*, 03(2019): 30-35 (Aug. 2019).

Huffman, "Benefits of State Based Control," *ABB Inc.*, White Paper, 32 pp. (Feb. 16, 2009).

Verein Deutscher Ingenieure E.V., "Automation engineering of modular systems in the process industry—General concept and interfaces," VDI/DE/NAMUR 2658 Blatt 1, 36 pp. (Oct. 2019).

Verein Deutscher Ingenieure E.V., "Automation engineering of modular systems in the process industry—Modelling of human-machine-interfaces," VDI/DE/NAMUR 2658 Blatt 2, 32 pp. (Nov. 2019).

Dai et al., "Application of Internet of Things Technology in Environmental Monitoring System of Injection Molding Workshop," *Plastics Science and Technology*, 48(7): 44-47 (Jul. 25, 2020).

Kurtoğlu et al., "Modular Multilevel Converters: A Study on Topology, Control and Applications," *2018 5th International Conference on Electrical and Electronic Engineering (ICEEE)*, 79-84 (May 3-5, 2018).

The Patent Office of the People's Republic of China, Office Action in Chinese Patent Application No. 202111323980.5, 8 pp. (Jun. 13, 2024).

* cited by examiner

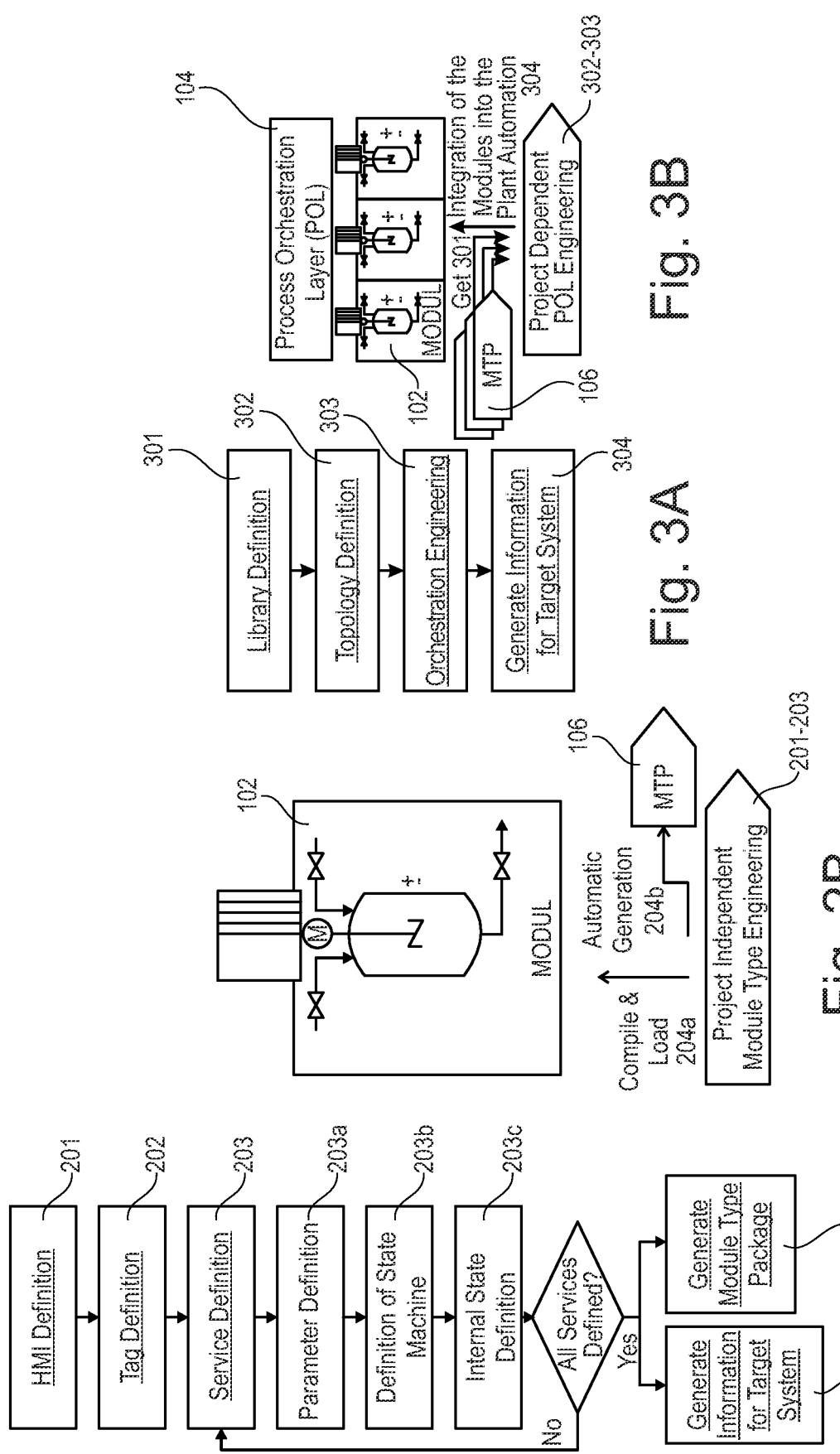

CONFIGURING MODULAR INDUSTRIAL PLANTS

CROSS-REFERENCE TO PRIOR APPLICATION

Priority is claimed to European Patent Application No. EP 20 206 705.4, filed on Nov. 10, 2020, the entire disclosure of which is hereby incorporated by reference herein.

FIELD

One or more embodiments of the present invention may relate to configuring modular industrial plants.

BACKGROUND

The Modular Type Package (MTP) standard in the field of modular automation systems creates a framework for interoperability between modules and the orchestration system, allowing industrial process plants to be built up and engineered in a more modular way, in order to simplify process plant engineering and life cycle management. These advantages are realized by prefabricated and well-tested modules, called PEAs (Process Equipment Assembly), that can easily be put together in different combinations so that different recipes can be realized.

In today's modular plants, modules are mostly defined and created individually and then integrated manually into the overall plant by the plant engineer. The integration of modules into the plant is a major engineering effort which involves ensuring input and output flow compatibility, the correct calibration of process parameters, and the proper management of alarms. Plant operators often invest significant time and resources in the integration of modules into the plant.

SUMMARY

One or more embodiments of the present invention may provide a method of configuring a modular industrial plant using an engineering tool. The method may comprise: using a plant engineering facility of the engineering tool to create a representation of the modular industrial plant identifying modules to be orchestrated in the modular industrial plant, the modules comprising at least one function module comprising control software for the modular industrial plant; using a module engineering facility of the engineering tool to configure the at least one function module for use in the modular industrial plant by editing a placeholder configuration file created by the engineering tool for defining the configuration of the at least one function module; wherein editing the placeholder configuration file causes a representation of the at least one function module in the plant engineering facility to be automatically updated to reflect adaptations made to the at least one function module using the module engineering facility; and instructing the engineering tool to assign each function module so configured to the modular industrial plant.

One or more embodiments of the present invention may provide a computer-implemented method for providing an engineering tool for configuring a modular industrial plant. The method may comprise: providing a plant engineering facility in the engineering tool configured to allow user creation of a representation of the modular industrial plant identifying modules to be orchestrated in the modular industrial plant, the modules comprising at least one function module comprising control software for the modular industrial plant; creating a placeholder configuration file for defining the configuration of the at least one function module; providing a module engineering facility in the engineering tool configured to allow user configuration of the at least one function module for use in the modular industrial plant by editing the placeholder configuration file; updating a representation of the at least one function module in the plant engineering facility to reflect adaptations made to the at least one function module using the module engineering facility; and providing functionality for assigning each function module so configured to the modular industrial plant.

There is therefore a need for facilitating and/or improving the configuration of modular industrial plants. This need is met by the subject-matter of the independent claims. Optional features are set forth by the dependent claims.

BRIEF DESCRIPTION OF THE DRAWINGS

One or more embodiments of the present invention may be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 2A and 2B illustrate a module type engineering workflow;

FIG. 3A and FIG. 3B illustrate a plant engineering workflow;

DETAILED DESCRIPTION

Figure 1:
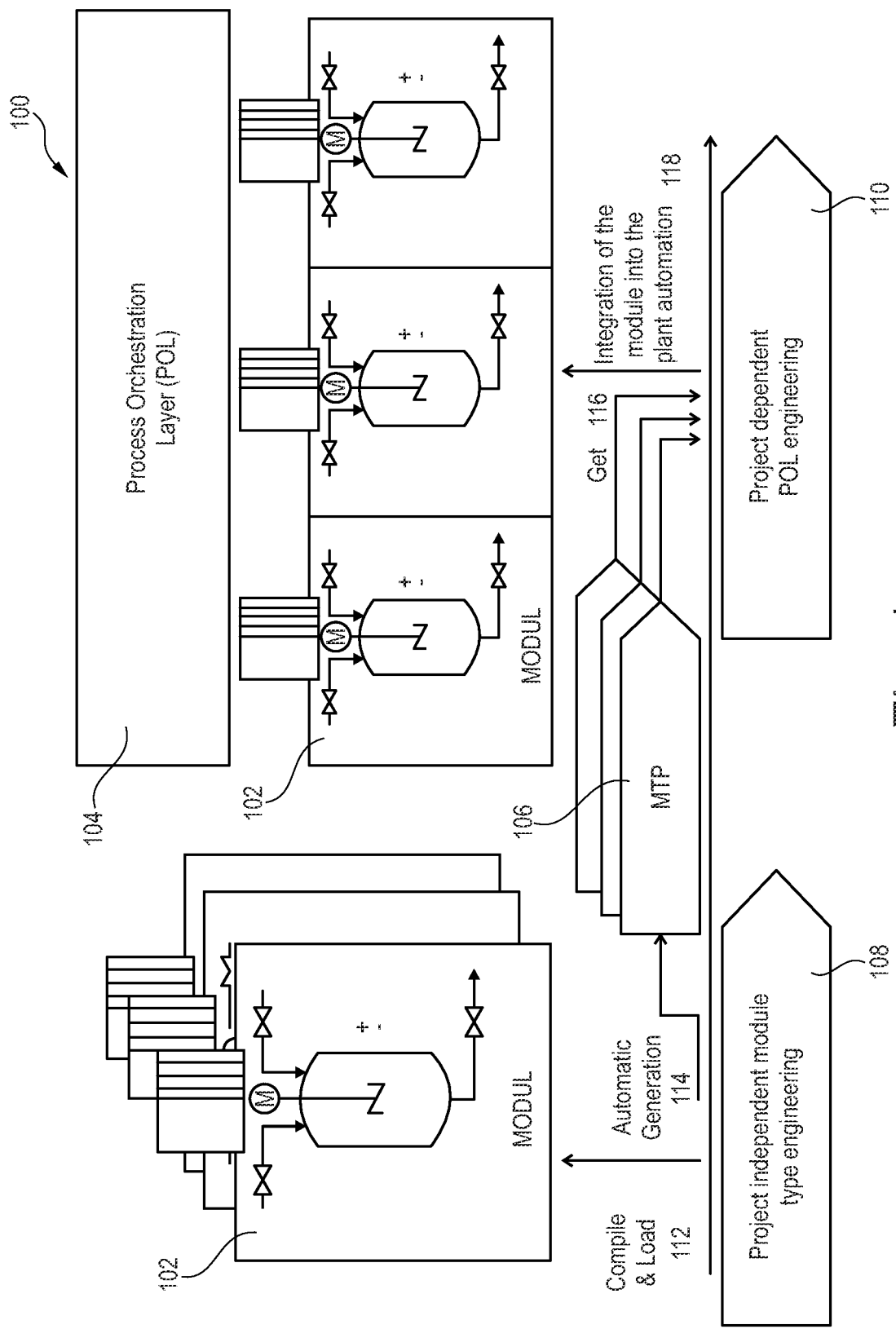
FIG. 1 illustrates an engineering workflow for modular plants.

According to a first aspect, there is provided a method of configuring a modular industrial plant using an engineering tool. The method comprises using a plant engineering facility of the engineering tool to create a representation of the modular industrial plant identifying modules to be orchestrated in the modular industrial plant, the modules comprising at least one function module comprising control software for the modular industrial plant. The method further comprises using a module engineering facility of the engineering tool to configure the function module for use in the particular modular industrial plant by editing a placeholder configuration file created by the engineering tool for defining the configuration of the function module. Editing the configuration file causes a representation of the function module in the plant engineering facility to be automatically updated to reflect adaptations made to the function module using the module engineering facility. The method finally comprises instructing the engineering tool to assign the function modules so configured to the modular industrial plant.

As mentioned above, the engineering workflow of a modular plant is typically split into two phases with a separate tool provided to do the engineering in each of the phases. According to the present disclosure, both phases are combined into a single phase which may be handled using a single, integrated engineering tool. In this way, full functionality of modular automation may be provided while the tool is nonetheless usable additionally for conventional plant engineering.

Editing the configuration file may be performed in a number of ways to facilitate parameterization of module (PEA) types. In particular, optional functionality may be provided inside the PEA types, allowing the engineer to decide whether this functionality is present or not. When the functionality is disabled, all parts belonging to that functionality are removed, which means not imported into the target system such that the PEA types can be adapted again during plant engineering. For example, editing the placeholder configuration file may comprise integrating at least one other function module into the function module whose configuration file is being edited. Additionally or alternatively, editing the configuration file may comprise selectively enabling or disabling at least one optional nested function module within the function module whose configuration file is being edited. Additionally or alternatively, editing the configuration file may comprise selectively enabling or disabling at least one optional service of the function module whose configuration file is being edited. Additionally or alternatively, editing the configuration file may comprises selectively enabling or disabling at least one optional process part of the function module whose configuration file is being edited. Additionally or alternatively, editing the configuration file may comprise connecting the function module without a service to another function module without a service, adding services to the connected function modules, and aggregating the connected function modules into a single function module at the plant control level. Additionally or alternatively, editing the configuration file may comprise selectively disabling an optional feature of the function module thereby suppressing application to the modular industrial plant of one or more aspects of the optional feature including: (i) corresponding control code, (ii) HMI parts, (iii) services.

According to a second aspect, there is provided a computer-implemented method for providing an engineering tool for configuring a modular industrial plant. The method comprises: providing a plant engineering facility in the engineering tool configured to allow user creation of a representation of the modular industrial plant identifying modules to be orchestrated in the modular industrial plant, the modules comprising at least one function module comprising control software for the modular industrial plant; creating a placeholder configuration file for defining the configuration of the function module; providing a module engineering facility in the engineering tool configured to allow user configuration of the function module for use in the particular modular industrial plant by editing the placeholder configuration file; updating a representation of the function module in the plant engineering facility to reflect adaptations made to the function module using the module engineering facility; and assigning (or providing functionality for assigning) the function modules so configured to the modular industrial plant.

The method of the second aspect may further comprise providing, in the module engineering facility, any one or more of the following additional features: (i) functionality to allow selective enabling or disabling of at least one optional nested function module within the function module whose configuration file is being edited; (ii) functionality to allow selective enabling or disabling of at least one optional service of the function module whose configuration file is being edited; (iii) functionality to allow selective enabling or disabling of at least one optional process part of the function module whose configuration file is being edited; (iv) functionality to allow the aggregation of multiple connected function modules into a single function module at the plant control level; (v) functionality to allow selective disabling of an optional feature of the function module thereby suppressing application to the modular industrial plant of one or more aspects of the optional feature including: (a) corresponding control code, (b) HMI parts, (c) services.

According to a third aspect, there is provided a computing device comprising a processor configured to perform the method of the second aspect.

According to a fourth aspect, there is provided a computer program product comprising instructions which, when executed by a computing device, enable the computing device to carry out the method of the second aspect.

According to a fifth aspect, there is provided a non-transitory computer-readable medium comprising instructions which, when executed by a computing device, enable the computing device to carry out the method of the second aspect.

In any of the above aspects, the configuration file may comprise a Modular Type Package (MTP) defining configuration of the module (e.g. a Process Equipment Assembly or PEA). In particular, the configuration file may be target system independent.

In the context of the present disclosure, the terms "module", "unit", and "PEA" are used interchangeably.

In the context of the engineering tool, the term "view" may relate for example to a user interface provided by the engineering tool, which may be implemented in software running on a computing device. A corresponding software package may be provided. The term "facility" is used to represent functionality of the engineering tool that may be accessible via or provided by a view. The engineering tool may have one or more environments.

One or more embodiments of the present invention may include one or more aspects, examples or features in isolation or combination whether or not specifically disclosed in that combination or in isolation.

These and other aspects of the invention will be apparent from and elucidated with reference to the embodiments described hereinafter.

Modular plants are typically engineered as shown in FIG. 1. The engineering workflow 100 is split into two phases: a (project-independent) module type engineering workflow 108 and a (project-dependent) plant engineering workflow 110. The module type engineering workflow 108 may be undertaken by a module supplier or by the owner of the modular plant. The plant engineering workflow 110 may be undertaken by the plant operator.

Within the module type engineering workflow 108, all engineering for a module type/PEA 102 is done, meaning: instrumentation, electrical, control engineering; physical connection of the inner process equipment; I/O marshaling and selection of the controller hardware; factory acceptance testing. A module type 102 is after its creation at 112 ready for use within a plant, because it provides an own intelligence and OPC UA server interface that can be used for controlling it. The interface of every module type 102 is described by generating at 114 an MTP 106, for example according to IEC63280 ED1 ACD. Every module type 102 uses services to expose its inner functions to the supervisory control system as services. A service-oriented architecture may be used. Behind every service, a defined state machine is executed and the states are exposed.

The MTP 106 is later used for the second part, the plant engineering workflow 110, where the MTPs 106 of the module types 102 are imported 116 and instances for the module types 102 are created, before being integrated at 118 into the plant automation. The decentralised automation of the different module types 102 is integrated in a Process Orchestration Layer (POL) 104.

FIGS. 2A and 2B illustrate the module type engineering workflow 108 in more detail. In order to engineer a module type 102, the human-machine interface (HMI) of the module type is first defined at 201, which may resemble for instance the engineering of a piping and instrumentation diagram. From the HMI, a tag list is automatically derived at 202. The tag list contains all tags that are used within the automation system. In the tag list, the user can change the parameters of the tags. Both, the tag type and the parameters may be compliant to IEC 63280 ED1 ACD. In the third step 203, the services for the module type 102 are defined. This begins with adding a service and additionally adding necessary service parameters at 203a that should be exposed to the supervisory control system. Service parameters might be for example "Amount" for a service "Fill", which is used to tell the "Fill"-service how much should be filled into the module. After the definition of the service, the state of the underlying state machine is filled with logic at 203b, 203c. The logic definition is still not bound to a target system but will later be used in steps 204a and 204b to create the target system specific information. In step 204a, the target system specific information is created and can be used for the automation of the module type 102. This is now bound to the target system and the target system cannot be exchanged later on during plant engineering. In step 204b, a target system specific MTP 106 is created that describes the interface of the module type 102.

FIG. 3A and FIG. 3B illustrate the plant engineering workflow 110 in more detail. The plant engineering workflow 110 also follows a four-step approach, where, in the first step 301, all module types 102 required in the plant are added to a module library. After adding the module types 102, defined by their MTPs 106, those can be used at 302 to create a topology of the modular plant, by creating module instances in the engineering tool and connecting them by means of material and information flow. At 303, the module instances can be used to define—based on their services—sequences that can be executed by the supervisory control system, POL 104. The supervisory control system 104 is in the last step 304 created from the information from the engineering tool.

The inventors have recognized several problems with this scenario. The engineering workflow of a modular plant is split into two phases, the module type engineering 108 and the plant engineering 110, which are decoupled from one another. Typically, two separate tools are used to perform the engineering in the respective phases. Moreover, the engineering workflow is bound to modular plants and can hardly be used for conventional (non-modular) plants. Additionally, once a PEA is developed, the functionality is fixed and cannot be changed. Similar modules need their own PEA type and cannot simply reuse the functionality that was designed for another PEA. If the PEA type changes, the corresponding MTP must be reimported and all instances have to be updated manually. In particular, when the functionalities of PEAs are very close to each other, unnecessary additional effort is required. If, nevertheless, a PEA type is used that provides more functionality, overhead in terms of code, HMI, etc. is imported into the target system. Unused code is usually not allowed in the control code of a process plant.

Described herein is a hierarchical engineering workflow which is performed using a single engineering tool (also referred to herein as a hierarchical engineering tool). The workflow starts with the plant engineering, at the very highest abstraction level of plant control. Using a plant engineering facility or view of the hierarchical engineering tool, instances of units are created. The instances might already have a type, but it is also possible to create new types. When a new type is created, a module type engineering facility of the hierarchical engineering tool is opened or started, and the engineer can undertake the necessary actions inside the module type engineering view. When the engineer changes a type, the changes are automatically populated to the next higher engineering view, e.g. the plant engineering view, and all instances are updated with the changes. At any time, it is possible to open a PEA type from the plant engineering view and to make changes. Inside the types, it is possible to integrate other PEA types. Integration of a PEA type into another PEA type is recursive.

In this way, all engineering is performed using the hierarchical engineering tool, which may have different views not only for the plant engineering and module type engineering, but also for function modules, third party modules, and so on. The abstraction used in the tool enables faster engineering. The hierarchical engineering tool enables a complete roundtrip engineering workflow, including a deep dive into single function module instances and the parameterization of the interior functions. Furthermore, a holistic and integrated engineering workflow is described, which is nevertheless able to be used for third party integration and the export of standardized descriptions of function modules, all from a single point of entry. The hierarchical engineering tool may be computer-implemented, for example using the computing device described below.

Figure 10:
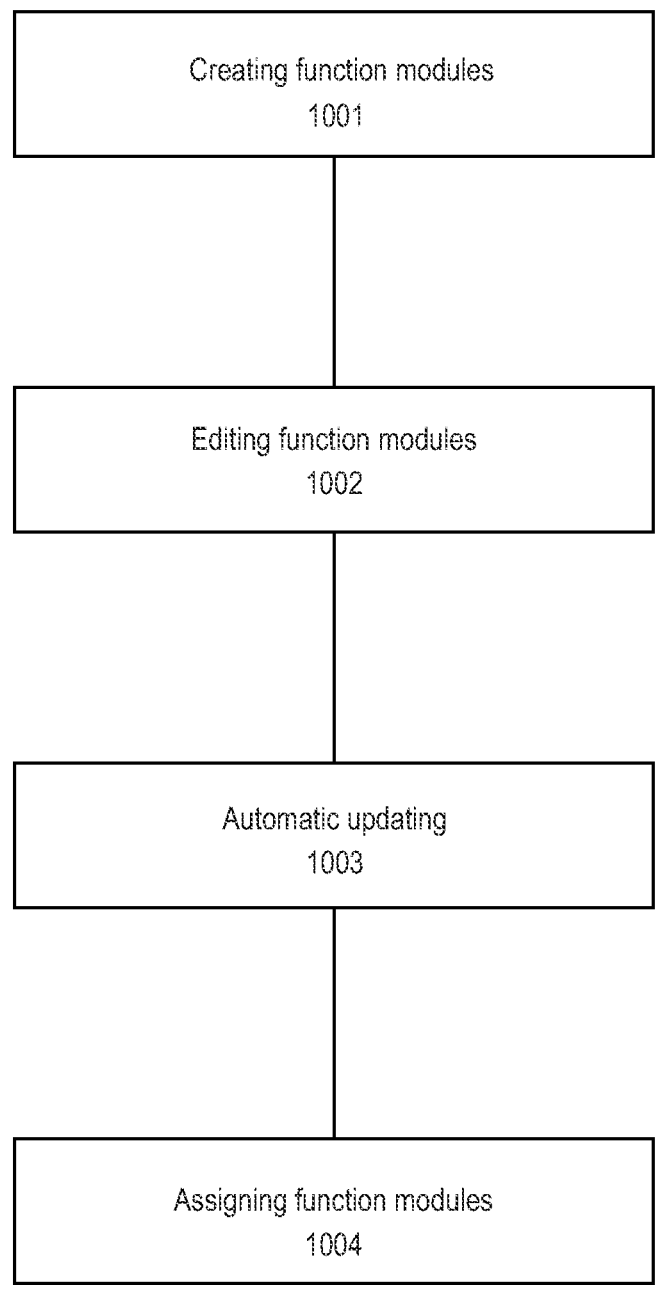
FIG. 10 is a flowchart representing a method of configuring a modular plant.

With reference to FIG. 10, an exemplary hierarchical engineering workflow will now be described, comprising the following steps. The workflow is used for configuring a modular plant.

Step 1001 comprises creating function modules and instances within the plant engineering view. As described further below, function modules are PEA types that are not bound to a target system. In the beginning, the function module is empty and only has a name: the function module serves initially as a placeholder. The engineer can now use the plant engineering view to dive into the module type engineering.

Step 1002 comprises diving deeper into a function module for performing the engineering of the same. The module type engineering view is opened and provides the engineering tools for the function module. The engineer can now describe the P&ID, the services, the tags, and so on for the function module, as is known in the art. Step 1002 optionally comprises integrating other function modules into the currently engineered function module.

Step 1003 comprises automatically updating one or more e.g. all instances of the function module in the plant engineering view. When the function module is described in step 1002, the engineer can save the new information and the new information is automatically uploaded into the plant engineering view, which means:

1. A target system independent MTP is created for the function module.
2. The MTP is automatically updated in the plant engineering view.
3. One or more e.g. all instances of the function module in the plant engineering environment are updated with the new information.
4. Conflicts are visualized to the engineer and can be resolved using a difference view. After continued use, a library of function modules will be available. The function modules can be shared across projects while being enhanced with new functionality. Additionally, it is possible to create function modules based on other function modules, or to integrate function modules into other function modules.

In what may be the last step, step 1004 comprises assigning the instances to the target systems and assign the tags of the instances to the target real process equipment.

The order of the steps disclosed herein is merely illustrative: to the extent that variations in the order are possible, these are envisaged by the present disclosure. Steps may be omitted or added as appropriate.

Figure 4:
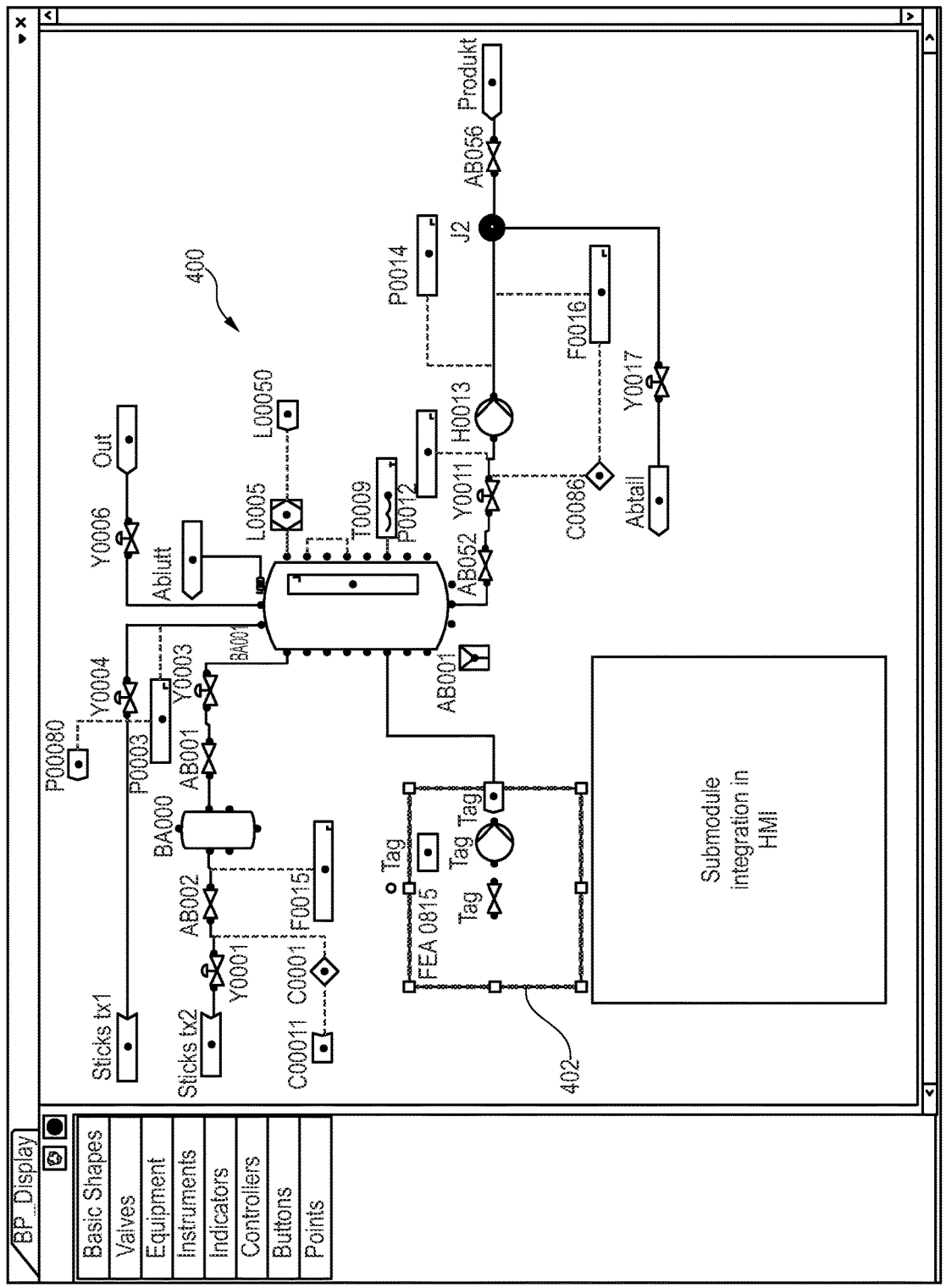
FIG. 4 illustrates a function module with an integrated sub function module.

FIG. 4 illustrates a function module with an integrated sub function module being configured using the engineering tool. In particular, FIG. 4 shows a P&ID 400 for a first function module into which a second function module 402 is being integrated as a sub function module. The sub function module 402 can be integrated into the P&ID 400 in the same way that any normal process equipment is integrated. In an orchestration project, function module instances can be embedded and these embedded function modules can further contain sub-function modules. As the sub-function modules and the function modules are both of the same template, even sub-function modules can further contain sub-sub-function modules (and so forth). An MTP library may contain an MTP type for function modules that can be engineered as sub-function modules within other function modules in the same project.

Figure 5:
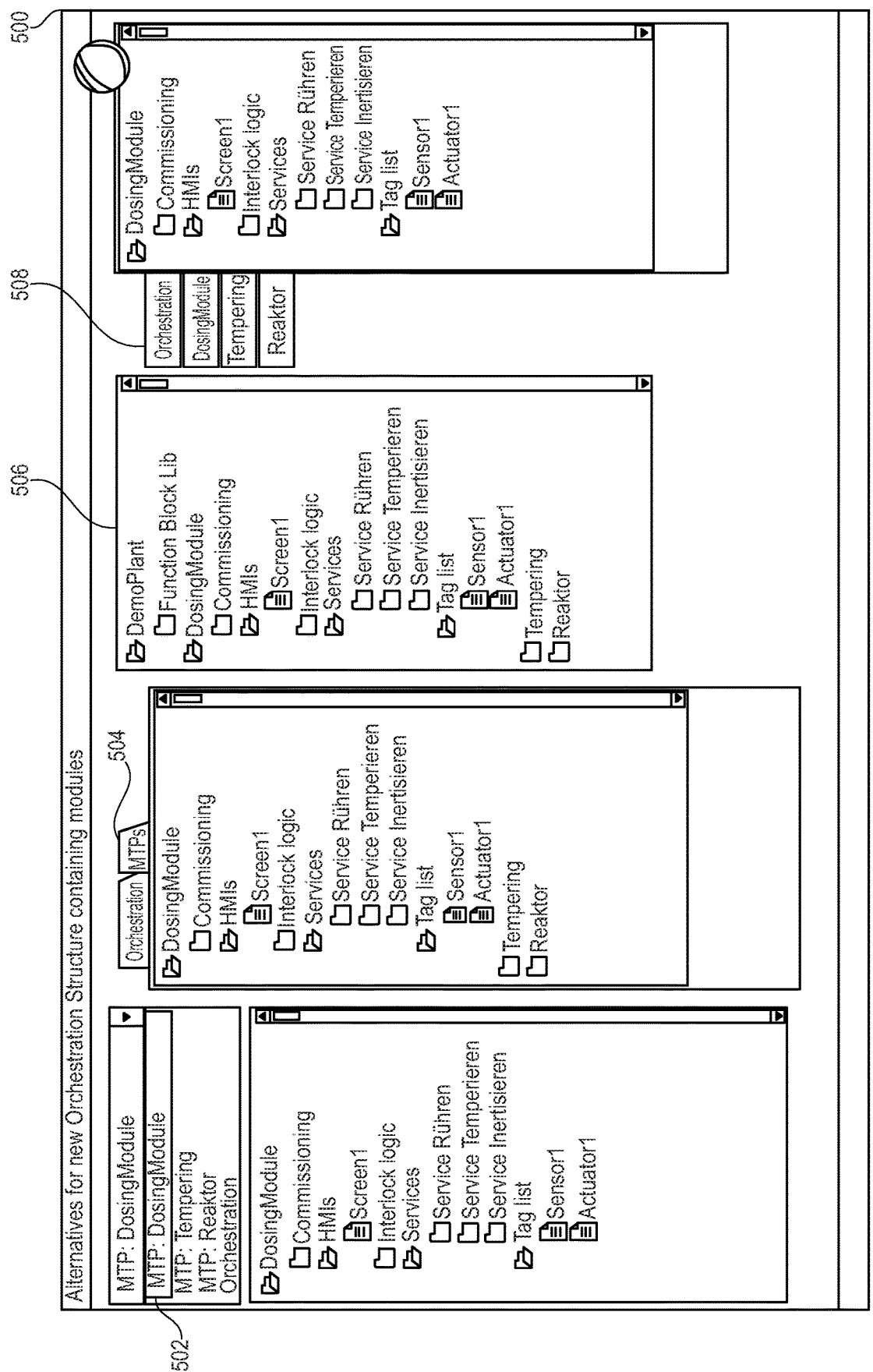
FIG. 5 shows a project view of a hierarchical engineering tool.

FIG. 5 shows a project view 500 of the hierarchical engineering tool, illustrating how to embed module type engineering and plant engineering in the project tree. Using either a dropdown menu 502 or tabs 504, various structures are selectable including the various MTPs and orchestration of the modular industrial plant. Shown here are MTPs for dosing, tempering and reactor modules alongside the orchestration. The MTPs and orchestration are also shown in parallel in the window 506. Further tabs 508 are provided for the selection of the MTPs and orchestration. Tabs for all structures except for the orchestration can be closed. Initially, only the orchestration tab is open.

Figure 6:
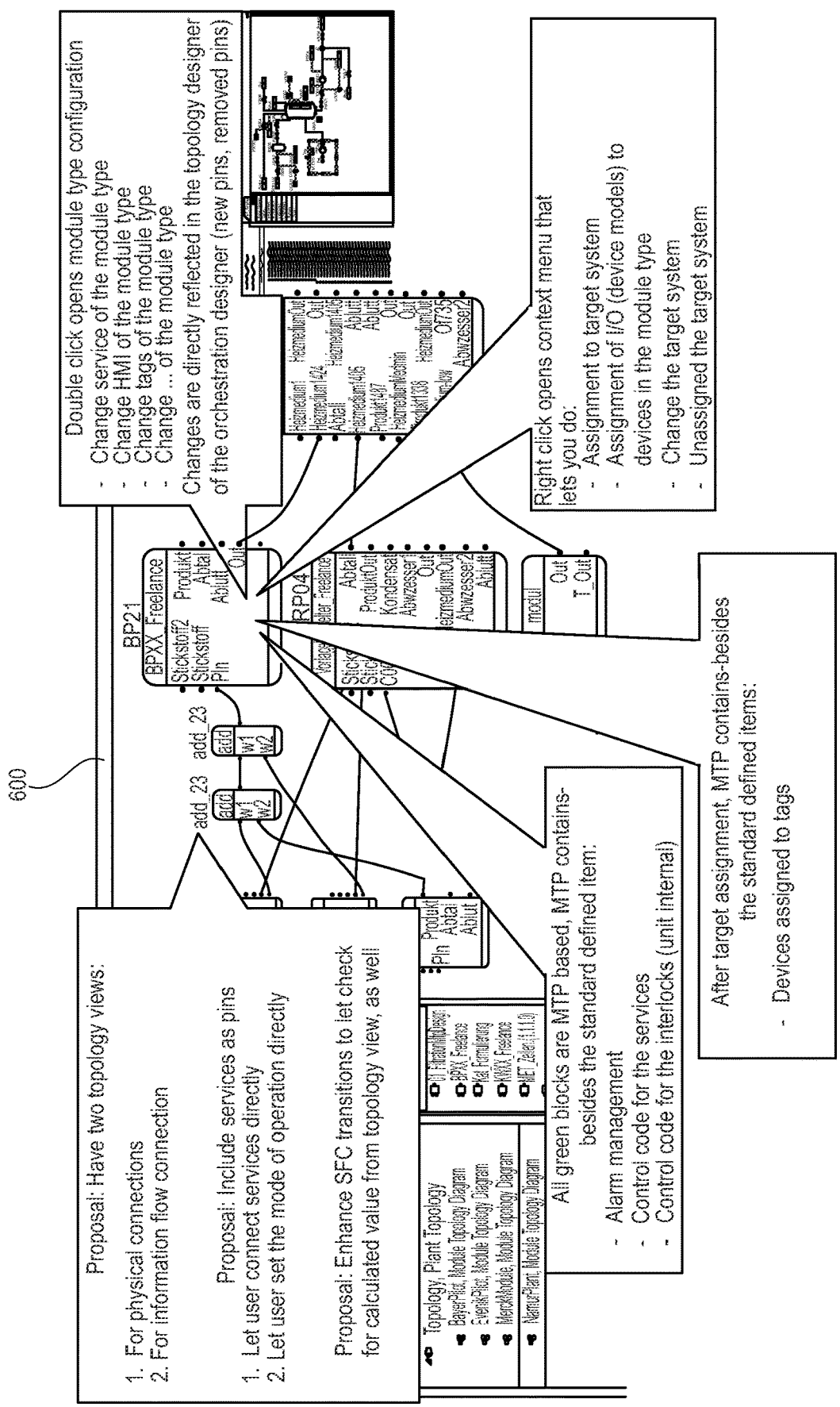
FIG. 6 illustrates a plant engineering view of the hierarchical engineering tool.

FIG. 6 illustrates the plant engineering view 600 of the hierarchical engineering tool. The plant engineering view 600 (which may also be referred to as an orchestration designer) provides two topology views: one for physical connections and one for information flow connections. Services may be added as pins to allow the user to connect services directly and to set the mode of operation directly. SFC transitions are enhanced to allow the user to check for calculated values from the topology view. As will be understood by the skilled person, SFC (sequential function chart) is a description of a sequence of actions that is executed for a plant. It consists of steps and transitions between steps. Only in steps is logic executed. For every transition between steps, a condition is described which, when true, allows the next step to be reached, which will execute another portion of code. Some blocks shown are MTP-based, containing (beside the standard defined items) alarm management, control code for the services, and control code for the interlocks (unit internal). After target assignment, the MTP contains (beside the standard defined items) devices assigned to tags. A right click on an MTP block opens a context menu which allows the user to perform assignment to the target system, to perform assignment of I/O (device models) to devices in the module type, to change the target system, and to unassign the target system. A double click on an MTP block opens the module type engineering view. Here, the user can change the services of the module type, change the HMI of the module type, change the tags of the module type, and make other changes to the module type. As described above, these changes are directly reflected in the topology views of the plant engineering view 600. Changes may for example be reflected by adding or removing pins. In this way, ready navigatation between the different views for the plant and module type engineering is provided. It is possible to open and edit a function module from the plant engineering view. It is possible to open and edit a function module from inside another function module.

According to the present disclosure, the description of the function modules and interfaces between function modules and the plant may use MTP. All function modules may be described as MTP. The MTP may be kept target system independent.

As mentioned above, the module types can be parameterized using the hierarchical engineering tool. The engineer can mark areas within a module type as optional. The optional parts can be enabled or disabled per instance on the plant engineering view 600. This provides for better reuse of module types and allow for broader usage in plants. Module types can be exchanged between projects in order to allow for even larger reuse. Module types may be based on the function module concept, as described further below, which makes them target system independent. Parameterization of the module type may be implemented using any one or more of the following options.

In a first option, optional functionality is implemented as a nested function module inside another function module. The user can enable or disable the complete nested function module during plant engineering.

In a second option, optional services are created within a function module which are enabled or disabled during plant engineering.

In a third option, optional process parts are marked within the function module and can be enabled or disabled during plant engineering.

In a fourth option, function modules without services are connected to each other and services are added for all the connected function modules. The function modules are then aggregated into a single function module during plant engineering.

In any of the options, if optional parts or features are disabled, the corresponding control code, HMI parts, services, etc. may not be imported into the target system, which keeps the resulting system clean.

Disclosed herein are two different types of parameterization: parameterization of the tags inside a function module instance, and parameterization of optional functionality of a function module.

Figure 7A:
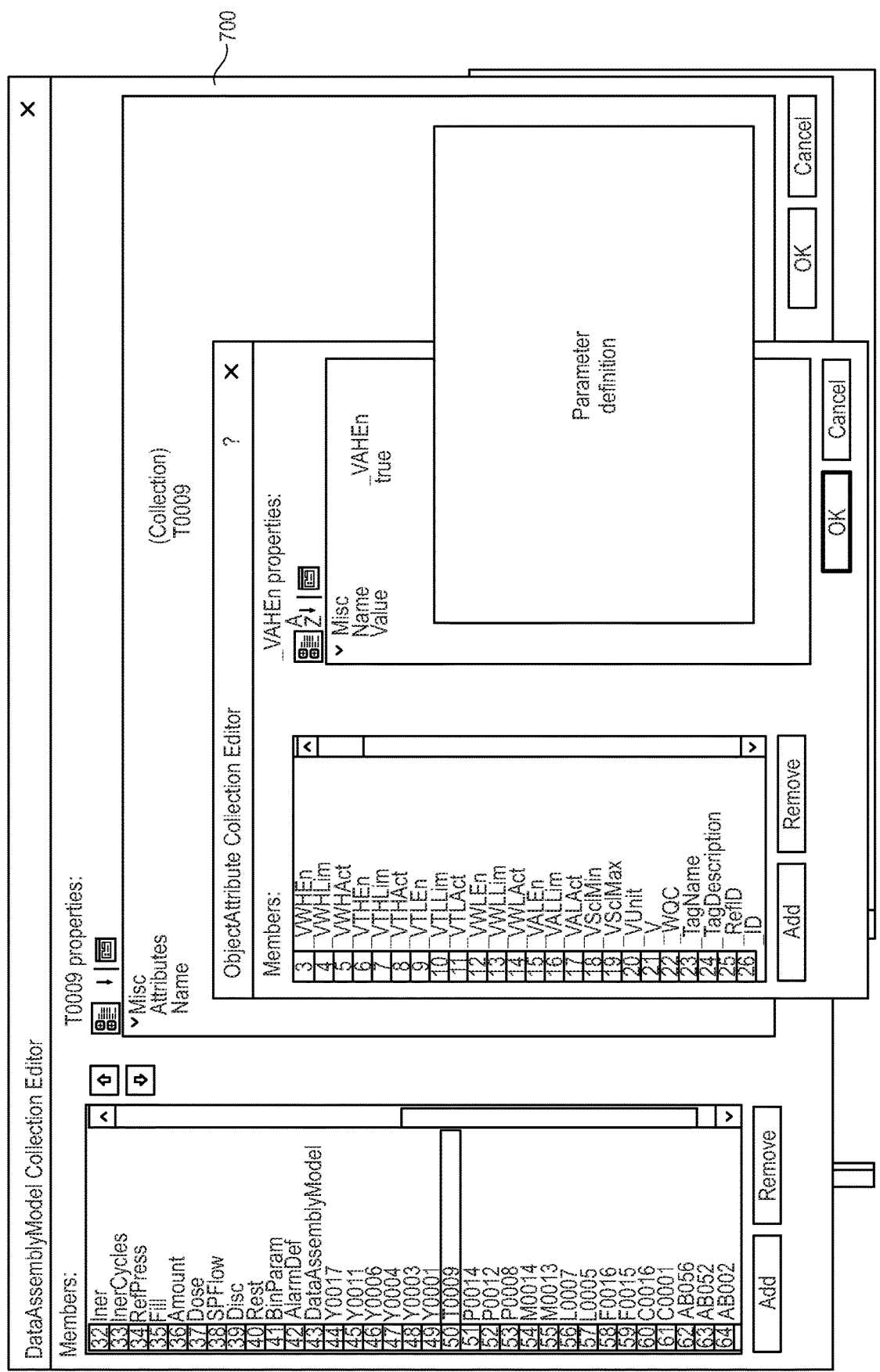
FIG. 7A shows a tag parameterization view for the parameterization of a function module instance.

For the tag parameterization, all publicly available parameters of the tags are exposed in the hierarchical engineering tool. The parameters can be set for every instance and will not be populated to other instances: they are bound to this specific instance. FIG. 7A shows a tag parameterization view 700 of the hierarchical engineering tool for the parameterization of a function module instance. Parameters can be set for different states of operation: (i) parameters are set for the default operation of the function module instance (e.g. when all services are switched off); (ii) parameters can be set depending on the services executed at present; (iii) parameters can be set depending on the state of operation (startup, shutdown, execution, and so on) of the plant. The configuration of the parameters is then imported into the runtime environment and, depending on the state of the function module instance, the parameter set as defined during engineering is taken.

Figure 7B:
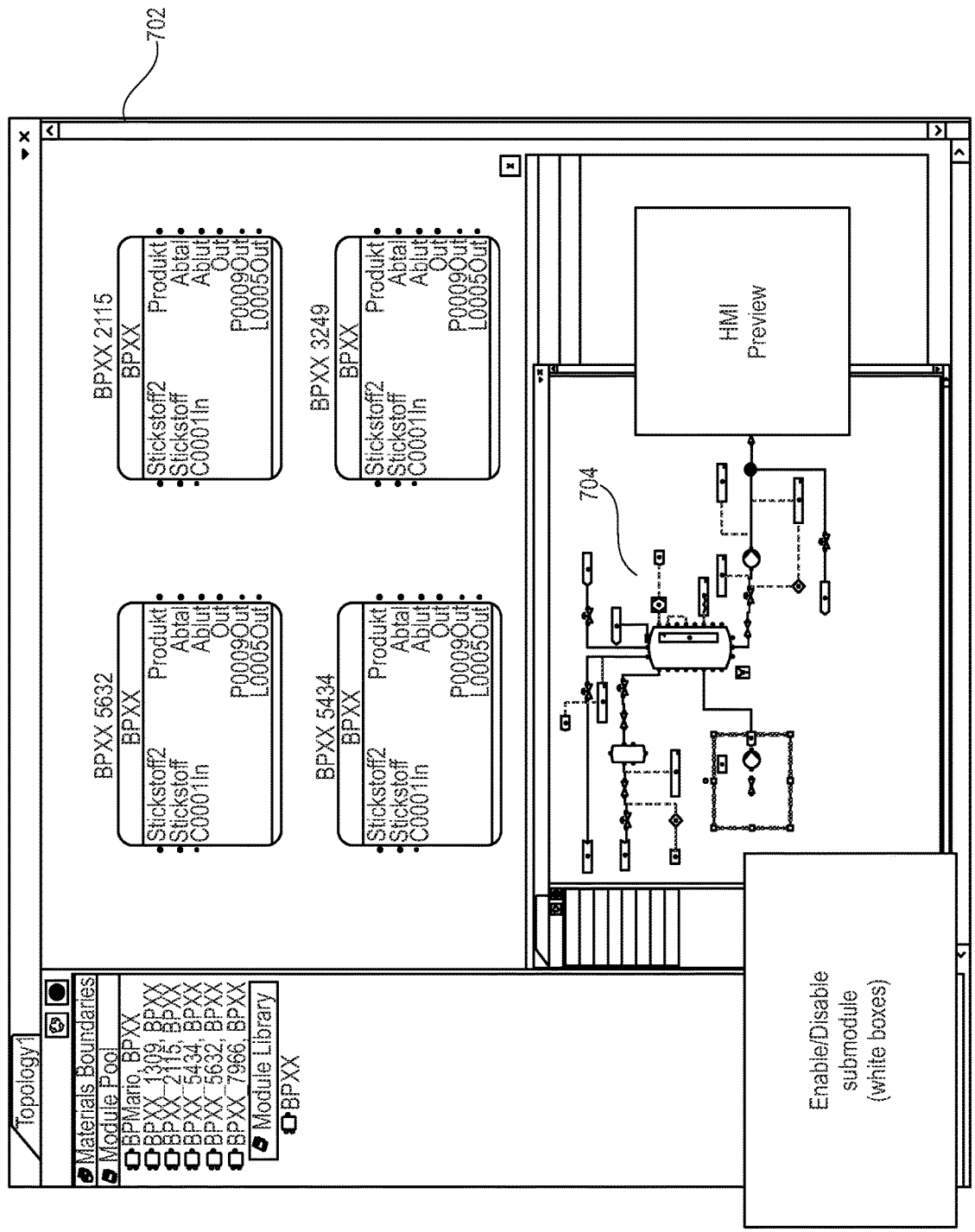
FIG. 7B shows a view representing a function module including sub-function modules.

For the parameterization of optional functionality, a graphical view of the interior of the function module is provided. FIG. 7B shows a possible implementation of the view 702. The P&ID 704, including the sub-function modules, is visualized. Within this view of the function module, the user can switch on and off the process equipment needed. For the parameterization of optional functionality, any one or more of the following three implementations may be used.

In a first implementation, optional services are defined, e.g. services that are not always present and/or which can be disabled in the plant engineering view. For disabled services, the HMI part and equipment are not imported into the target system (mapping of equipment to services may nonetheless be needed and can be detected automatically). This useful for, for example, a tempering module that can heat and optionally cool. In case that cooling is not possible, the instrumentation parts for that as well as the service are omitted.

In a second implementation, "white box" sub-modules are used, for which the MTP contains optional instruments. For example, a valve (instrument) may be described in the same way as a module (taking a device integration approach using an MTP) and the MTP of the instrument can be added to an existing module. The optional module is open to be controlled from the outside (via the super-module). The super module does not forward interfaces of the sub-module and the sub-module does not have its own services (additional instruments may be used in the services of super-module). The HMI is described in the MTP as usual (and will be placed/generated in super-module at a certain place). This implementation is useful for example in modules where certain (e.g. smaller) parts are optional, e.g. an additional closing valve.

In a third implementation, module aggregation ("module of modules") is used. In this case, each part in a module is defined as a module and modules inside other modules can be disabled. For disabled modules, the HMI part and equipment are not imported into the target system. Modules are aggregated on the next higher level, while aggregation is performed only for the modules that are not disabled. This implementation is useful for, for example, bigger modules that consist of several modules.

Figure 8:
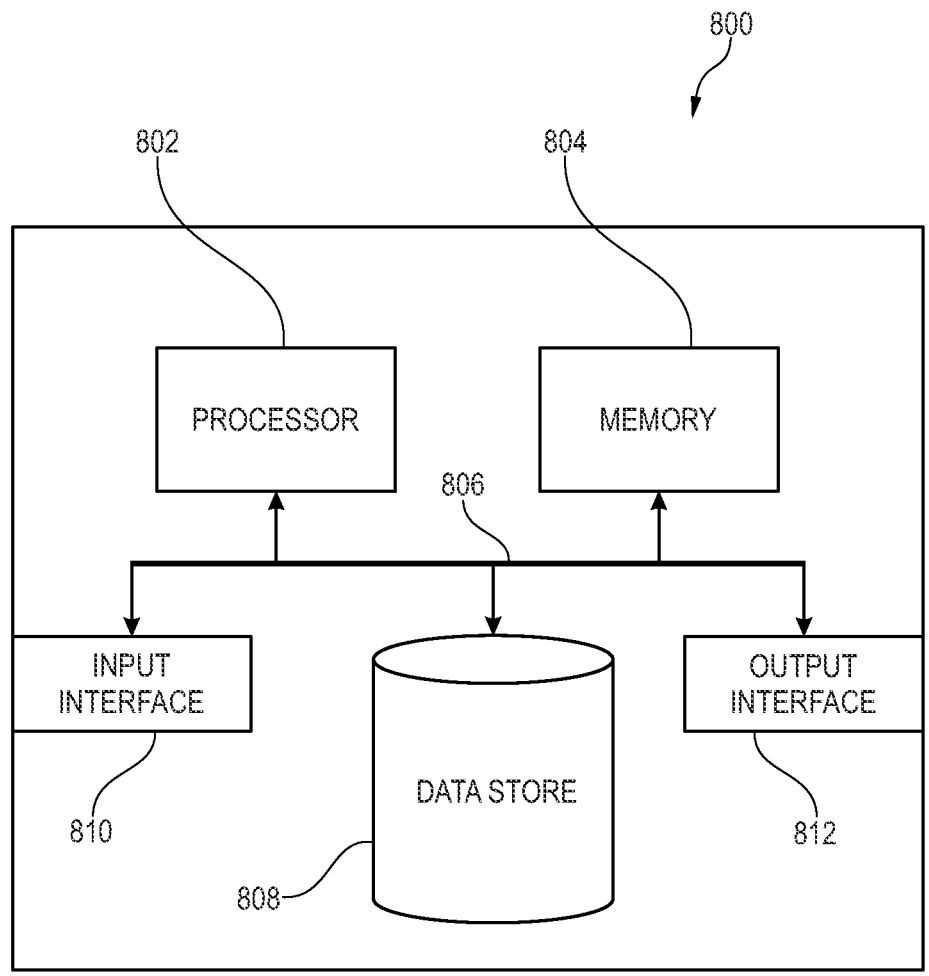
FIG. 8 illustrates a computing device that can be used in accordance with the systems and methods disclosed herein.

Referring now to FIG. 8, a high-level illustration of an exemplary computing device 800 that can be used in accordance with the systems and methodologies disclosed herein is illustrated. In particular, the computing device may be used to implement the above-described hierarchical engineering tool. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing device 800 additionally includes a data store 808 that is accessible by the processor 802 by way of the system bus 806. The data store 808 may include executable instructions, log data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Figure 9:
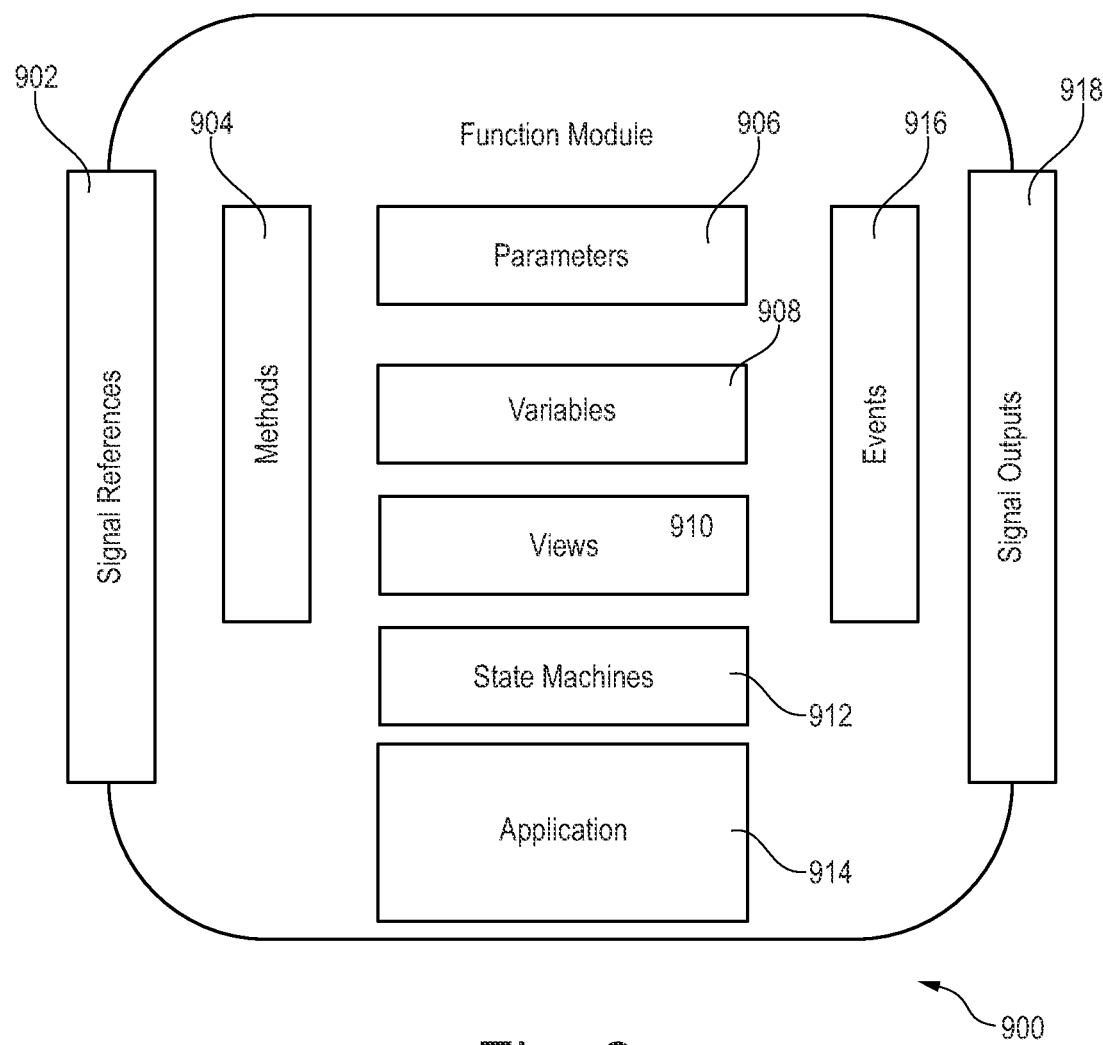
FIG. 9 illustrates content of a virtual PEA/function module.

FIG. 9 shows the content of a virtual PEA/function module 900 as described herein. The inventors have developed the virtual PEA/function module 900 as a software description of a module type 102. Broadly speaking, the virtual PEA/function module 900 serves as a control software configuration for a module 102 of a modular plant, specifying parameters for the said module that are not specific to any target system, such as default parameters. The virtual PEA/function module 900, serving as the control software configuration, is provided as a controller-agnostic configuration file, in other words a target-system-independent configuration file—in one example a generic MTP 106—for subsequent binding of controller software instantiated according to the controller-agnostic configuration file to a hardware controller of the said module when the said module is integrated into a target system during plant engineering.

More particularly, instead of having a binding to a specific target system, the virtual PEA/function module 900 contains only the description of the functionality which the target system should contain. For example, the virtual PEA/function module 900 may contain the same information as the module type 102 described above, in addition to information concerning the logic that is executed inside the states of the services (application 914 in FIG. 9). The application 914 includes the states executed in the overarching state machine. Only the state machine is externally visible. The states are defined as extended cause-and-effect matrices, as for the module type 102 described above. The application 914 optionally also contains logic that is predetermined to be executable independently of the state machines. In one example for equipment protection, if for example a valve is closed, all succeeding pumps have to be stopped to prevent them from running dry. Further examples of logic that is predetermined to be executable independently of the state machines includes opening a release valve in response pressure in a vessel becoming too high, and opening a release valve to flare in response to too much pressure in a gas pipeline. This kind of logic has to be executed always and independently of the services and the (specifics of the) state-machine controlling the service. Further such examples will be apparent to the skilled reader and are encompassed by this disclosure, which should not be taken as limiting to any one such example. This enables the virtual PEA/function module 900 to be portable to different kinds of target system, because the application 914 that should be executed within the states is not yet bound to any target system. The parameters may further specify communications for the target module 102.

For every control equipment (sensor, valve, etc.) used in the module, a set of parameters is defined. There may be different kinds of parameters for the module that are not specific to any target system, as in the following non-limiting examples. Further such examples will be apparent to the skilled reader and are encompassed by this disclosure, which should not be taken as limiting to any one such example.

A sensor for example has a range, meaning it can measure 1 . . . 10 bar. These parameters depend on the final hardware used—a sensor cannot measure outside its measuring range. Those parameters are set once, when later (during plant engineering) the target system and the devices are assigned, and remain constant. When in different instances of the function module different sensor types are used to measure the pressure, this parameter is later adapted (e.g. during plant engineering) when the target hardware and devices are assigned to the function module instance (as an instance of a software controller instantiated according to a controller-agnostic configuration file). The block controlling a sensor can specify limits. A limit is a software-defined number that must be inside the measuring range. It can be used to raise alarms if the measure value is over/under a defined limit. These limits can be parameterized everywhere in the application. In one non-limiting example, to provide parameters that are not specific to any target system, default limits may be set, and later changed, if necessary. A typical case is that, during startup, the limits are set broader to avoid alarm floods and once the module is running in steady-state, the limits are narrowed down to keep the process in an optimal operating state.

A service might have parameters for configuration of how it should perform, e.g. the process value is measured inside the module or comes from somewhere else. The configuration parameters may show which of the sources is used. In one non-limiting example of a parameter that is not specific to any target system, a default source may be specified, in order to provide a defined state for the case in which no further parameterization is performed. Alternatively, the parameter may be forgotten during adaptation. In another non-limiting example, default service parameters may be given for setpoints, e.g. the fill service should fill the vessel to 50%.

All the above-described parameter types are typically exposed as OPC UA variables by the OPC UA server of the module. Since the OPC UA Server does not exist in the virtual PEA/function module 900, and is only later added to the function module instance, the engineer can set default values to the parameters. Those can be (i) subsequently changed during plant engineering, (ii) provided by the actual OPC UA server of the assigned target system, or (iii) set for every state of the state machines or for every service or module wide (i.e. only one parameter value is given that is used for all operating states).

As shown in FIG. 9, the virtual PEA/function module 900, provided as a controller-agnostic configuration file, for example in the form of a generic MTP 106, specifies one or more of the following for the target module 102: (i) one or more parameters 906, (ii) one or more variables 908, (iii) one or more views 910; (iv) one or more state machines 912; (v) one or more applications 914; (vi) one or more events 916; (vii) one or more methods 904; (viii) one or more signal references 902; (ix) one or more signal outputs 918.

The virtual PEA/function module 900 thus provides for automation of PEAs that do not have an embedded controller and OPC UA server. The automation of the virtual PEA/function module 900 can be carried out in a central or distributed control system and it is possible to have several virtual PEAs/function modules 900 on one controller. The virtual PEA/function module 900 decouples the control application software from the controller and input/output hardware of a PEA. Instead of binding the control application software to hardware as a controller, input and output hardware design may be performed in later steps. The software description may be exported as the virtual PEA/function module 900 into a controller-agnostic (in other words hardware-independent) MTP 106. During plant engineering, the virtual PEA/function module 900 can then be assigned to a controller and input/output signals can be matched. Thus, it may also be possible to assign several virtual PEAs/function modules 900 to a single controller and to reuse the virtual PEA/function module 900 with another vendor or target system later.

As will be apparent, the present disclosure thus provides a hierarchical engineering tool with parameterization of function modules instances.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

While one or more embodiments of the invention have been illustrated and described in detail in the drawings and foregoing description, such illustration and description are to be considered exemplary and not restrictive. The invention is not limited to the disclosed embodiments.

Other variations to the disclosed embodiments can be understood and effected by those skilled in the art, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used advantageously. A computer program may be stored/distributed on a suitable medium, such as an optical storage medium or a solid-state medium supplied together with or as part of other hardware, but may also be distributed in other forms, such as via the internet or other wired or wireless communications systems. Any reference signs in the claims should not be construed as limiting the scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of configuring a modular industrial plant using an engineering tool, the method comprising:
    using a plant engineering facility of the engineering tool to create a representation of the modular industrial plant identifying modules to be orchestrated in the modular industrial plant, the modules comprising at least one function module comprising control software for the modular industrial plant, wherein the plant engineering facility provides at least one topology view for defining flow of information or material between the modules;
    using a module engineering facility of the engineering tool to configure the at least one function module for use in the modular industrial plant by editing a placeholder configuration file created by the engineering tool for defining the configuration of the at least one function module;
    wherein editing the placeholder configuration file comprises selectively disabling an optional feature of the at least one function module thereby suppressing application to the modular industrial plant of one or more aspects of the optional feature including corresponding control code, human-machine interface (HMI) parts, and services, and wherein editing the placeholder configuration file causes a representation of the at least one function module in the plant engineering facility to be automatically updated to reflect adaptations made to the at least one function module using the module engineering facility, wherein the adaptations are directly reflected in the at least one topology view of the plant engineering facility; and
    instructing the engineering tool to assign each of the at least one function module so configured to the modular industrial plant.

2. The method of claim 1, wherein editing the placeholder configuration file comprises integrating at least one other function module into the at least one function module whose configuration file is being edited.

3. The method of claim 1, wherein editing the placeholder configuration file comprises selectively enabling or disabling at least one optional nested function module within the at least one function module whose placeholder configuration file is being edited.

4. The method of claim 1, wherein editing the placeholder configuration file comprises selectively enabling or disabling at least one optional service of the at least one function module whose placeholder configuration file is being edited.

5. The method of claim 1, wherein editing the placeholder configuration file comprises selectively enabling or disabling at least one optional process part of the at least one function module whose placeholder configuration file is being edited.

6. The method of claim 1, wherein editing the placeholder configuration file comprises connecting the at least one function module without a service to another function module without a service, adding services to the connected function modules, and aggregating the connected function modules into a single function module at the plant control level.

7. A computer-implemented method for providing an engineering tool for configuring a modular industrial plant, the method comprising:
 providing a plant engineering facility in the engineering tool configured to allow user creation of a representation of the modular industrial plant identifying modules to be orchestrated in the modular industrial plant, the modules comprising at least one function module comprising control software for the modular industrial plant, wherein the plant engineering facility provides at least one topology view for defining flow of information or material between the modules;
 creating a placeholder configuration file for defining the configuration of the at least one function module;
 providing a module engineering facility in the engineering tool configured to allow user configuration of the at least one function module for use in the modular industrial plant by editing the placeholder configuration file, wherein editing the placeholder configuration file comprises selectively disabling an optional feature of the at least one function module thereby suppressing application to the modular industrial plant of one or more aspects of the optional feature including corresponding control code, human-machine interface (HMI) parts, and services;
 updating a representation of the at least one function module in the plant engineering facility to reflect adaptations made to the at least one function module using the module engineering facility by editing the placeholder configuration file, wherein the adaptations are directly reflected in the at least one topology view of the plant engineering facility; and
 providing functionality for assigning each of the at least one function module so configured to the modular industrial plant.

8. The method of claim 7, comprising providing in the module engineering facility functionality to allow selective enabling or disabling of at least one optional nested function module within the at least one function module whose placeholder configuration file is being edited.

9. The method of claim 7, comprising providing in the module engineering facility functionality to allow selective enabling or disabling of at least one optional service of the at least one function module whose placeholder configuration file is being edited.

10. The method of claim 7, comprising providing in the module engineering facility functionality to allow selective enabling or disabling of at least one optional process part of the at least one function module whose placeholder configuration file is being edited.

11. The method of claim 7, comprising providing in the module engineering facility functionality to allow the aggregation of multiple connected function modules into a single function module at the plant control level.

12. A computer comprising a processor configured to perform the method of claim 7.

13. A non-transitory computer-readable medium comprising instructions that, when executed by a computer, enable the computer to carry out the method of claim 7.

* * * * *